United States Patent Office 2,755,065
Patented July 17, 1956

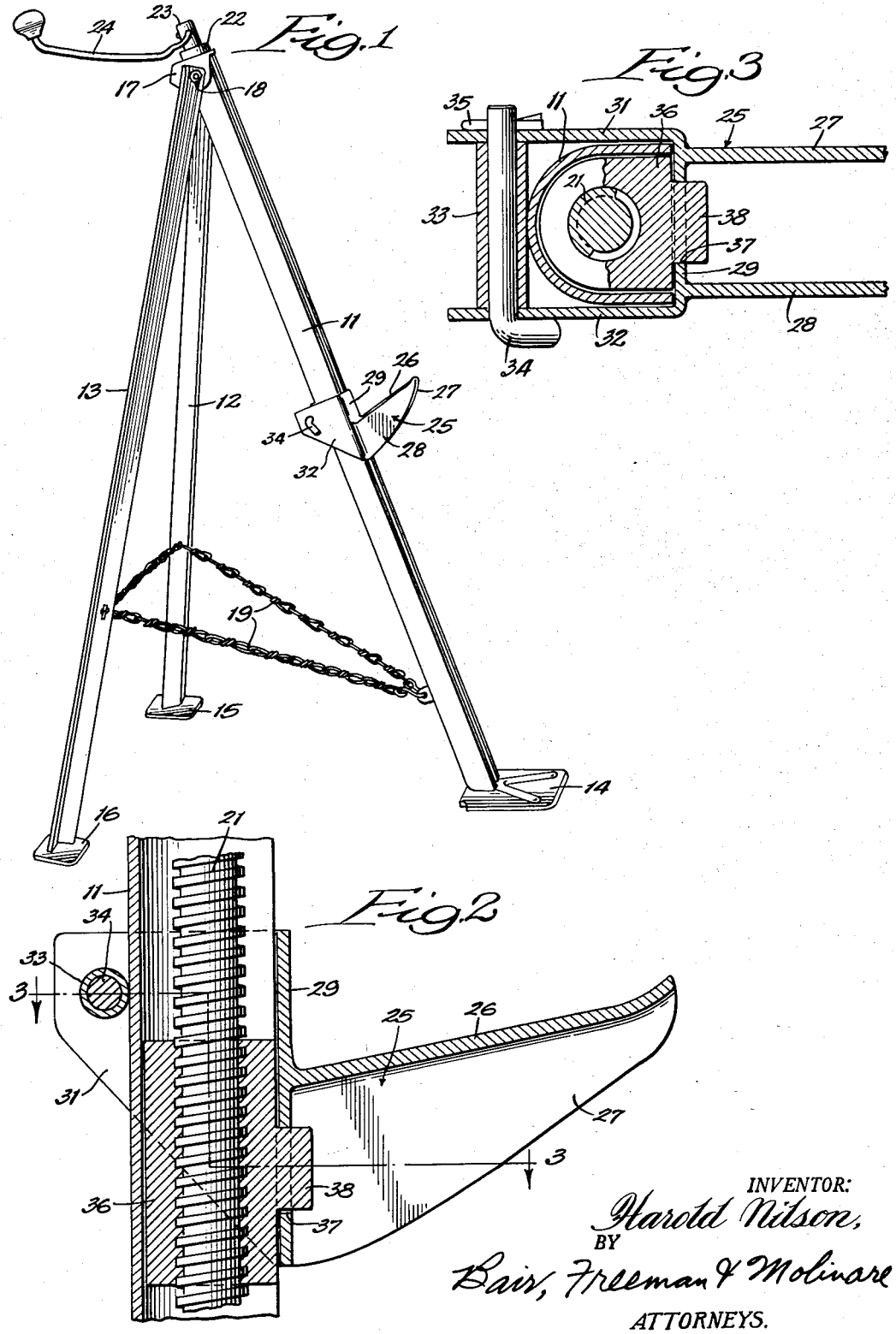

2,755,065
LIFTING MEMBER FOR AUTOMOBILE JACKS

Harold Nilson, Wayzata, Minn., assignor to Vulcan Manufacturing Co., Inc., Winona, Minn., a corporation of Minnesota Application January 2, 1953, Serial No. 329,420

1 Claim. (Cl. 254—99)

This invention relates to a bumper jack for automobiles and the like and particularly to a novel lifting hook for a bumper jack.

It is an object of the invention to provide an improved lifting hook for a bumper jack which will properly engage with the bumper of the majority of automobiles now being manufactured.

It is another object of the invention to provide a lifting hook for a bumper jack which is exceptionally strong and which may be readily assembled on or detached from the jack.

With these and other objects in view, my invention consists in the construction, arrangement and combination of the various parts of my device whereby the objects contemplated are attained, as hereinafter more fully set forth, pointed out in my claim and illustrated in the accompanying drawings, wherein:

Figure 1 is a perspective view of a tripod type bumper jack showing the improved lifting hook;

Figure 2 is a partial sectional view of the leg of the bumper jack to which the hook is attached and also shows the hook in section; and Figure 3 is a sectional view taken on line 3—3 of Figure 2.

Referring specifically to the drawing, it is noted that the novel lifting hook is applied to a tripod type bumper jack, but it may be applied to a bumper jack with a single leg or with two legs. Numeral 11 designates a generally U-shaped channel member and numerals 12 and 13 indicate the bracing legs of the tripod jack. Pads 14, 15 and 16 are welded to the legs 11, 12 and 13, respectively, to give the jack stability when it is placed on the ground. A head plate 17 is preferably welded to the upper end of the leg 11 and has an aperture therein, not shown, for a purpose hereinafter described. The legs 12 and 13 are pivoted to wing portions of the head plate 17 as shown in Figure 1 at 18. A chain 19 connects the legs 11, 12 and 13 so that they cannot be extended beyond a predetermined point. Obviously, when the jack is not in use, the legs 12 and 13 are pivoted about pivot 18 so that the jack may be collapsed and take up the minimum of space.

A jack screw 21 is positioned within the U-shaped channel member 11 and extends through the opening in the head plate 17, as shown at 23. The jack screw 21 is journalled in a member 22 positioned above the head plate 17. A handle 24 is pivotally attached to the extension 23 of the jack screw 21 so that it may be rotated to raise and lower the hook which is generally indicated by the numeral 25. The jack described is substantially the same as the jack shown in Palka Patent No. 2,608,382.

The hook 25 comprises a substantially flat bumper engaging portion 26 having downwardly extending flanges 27 and 28. The flat portion 26 is inclined upwardly to a slight extent and this configuration will fit bumpers of the majority of automobiles now being manufactured. The flat portion 26 and the flanges 27 and 28 are preferably welded to a flat portion 29 which extends across the front of the U-shaped leg 11. Flanges 31 and 32 extend rearwardly from the portion 29. A rotatable hollow cylindrical member 33 is held in position at the back of the leg 11 by a rod 34 and is journalled on said rod. The rod 34 is provided with a bent portion at one end and is provided with an aperture at the other end, through which a cotter pin 35 extends to hold the rod 34 in position. The rotatable member 33 contacts the back of the leg 11 and as the hook 25 is raised and lowered, the member 33 rotates.

A block 36 is threaded into the jack screw 21 and has an extension 38 which extends through an opening 37 in the flat member 29. Therefore, as the jack screw 21 is rotated the block 36 and extension 38 are raised or lowered and the hook 25 is likewise raised or lowered.

From the foregoing, it will be apparent that I have provided a novel lifting hook for an automobile bumper jack which is exceptionally strong and is easy to raise and lower. Furthermore, the hook 25 may be assembled on or detached from the leg 11 by merely removing the cotter pin 35 and sliding the rod out of the rotatable member 33, since the rotatable member 33 is detachable from between the flanges 31 and 32 when the rod 34 is removed.

Some changes may be made in the construction and arrangement of the parts of my device without departing from the real spirit and purpose of my invention, and it is my intention to cover by my claim any modified forms of structure or use of mechanical equivalents which may be reasonably included within its scope.

I claim as my invention:

A bumper jack for automotive vehicles including a generally upright member open on at least one side, a hook member adapted to engage a bumper, a threaded rotatable member adapted to engage a bumper, a threaded rotatable jack screw partially encompassed by said upright member, means for rotating said jack screw, a threaded member cooperating with the threads on the jack screw and adapted to be raised and lowered by rotation thereof, said threaded member having a projecting portion freely engageable with a portion of said hook to raise and lower the same, said hook comprising a first member extending across at least one open side of said upright member and engaging with said portion of the threaded member, a second member attached to said first member and extending forwardly thereof, means for retaining said first member in engagement with said portion of the threaded member, said means including rearwardly extending flanges partially encompassing said upright member, a connection between said flanges freely engaging rear portions of said upright member, said connection including a single rotatable roller engaging the rear of said upright member, and means affording ready removal of said roller, whereby the hook may be removed from said projecting portion of the threaded member.

References Cited in the file of this patent
UNITED STATES PATENTS

| | | |
|---|---|---|
| 692,179 | Callahan | Jan. 28, 1902 |
| 1,477,790 | Townsend | Dec. 18, 1923 |
| 2,543,100 | Engh | Feb. 27, 1951 |
| 2,608,382 | Palka | Aug. 26, 1952 |
| 2,663,542 | Lincoln et al. | Dec. 22, 1953 |

FOREIGN PATENTS

| | | |
|---|---|---|
| 673,531 | France | Oct. 8, 1929 |
| 974,647 | France | Oct. 4, 1950 |